United States Patent [19]

Alluto et al.

[11] Patent Number: 4,645,124

[45] Date of Patent: Feb. 24, 1987

[54] DEVICE TO COMPENSATE FOR AN EXTERNAL SOURCES' THERMIC EFFECTS ON A SENSITIVE ELEMENT IN AN AUTOMATIC CONTROL SYSTEM OF THE TEMPERATURE REACHED BY FOODS IN HEATED VESSELS

[75] Inventors: Luigi Alluto, Moncalieri; Romeo Delotto, Vinovo; Vanis Orlandin, Pinerolo, all of Italy

[73] Assignee: Indesit Industria Elettrodomestici Italiana S.p.A., Turin, Italy

[21] Appl. No.: 692,032

[22] Filed: Jan. 16, 1985

[30] Foreign Application Priority Data

Jan. 18, 1984 [IT] Italy ................... 67049 A/84

[51] Int. Cl.[4] ............................................. F23N 1/08
[52] U.S. Cl. .................................. 236/20 A; 219/516
[58] Field of Search ................... 236/20 A, 68 B; 219/516, 450; 126/396, 374; 99/329 R

[56] References Cited

U.S. PATENT DOCUMENTS 3,023,294  2/1962  Severson et al. .......... 236/20 A UX
3,047,705  7/1962  Manecke ................... 236/20 A UX
3,051,813  8/1962  Busch et al. ............... 236/20 A UX Primary Examiner—William E. Wayne
Attorney, Agent, or Firm—Gifford, Groh, VanOphem, Sheridan, Sprinkle and Dolgorukov

[57] ABSTRACT

A device to compensate for the thermic effects of an external source on a sensitive element in a system for automatically controlling the temperature reached by foods in heated vessels. The device includes a conventional range and a potentiometer for controlling a gas or electric heating element. Two heat sensitive elements are employed, one sensing pan temperature, and the other sensing ambient temperature. Electric circuitry automatically adjusts the heating element to reduce the heat output as the ambient temperature rises, so that a more constant vessel temperature is achieved.

15 Claims, 3 Drawing Figures

DEVICE TO COMPENSATE FOR AN EXTERNAL SOURCES' THERMIC EFFECTS ON A SENSITIVE ELEMENT IN AN AUTOMATIC CONTROL SYSTEM OF THE TEMPERATURE REACHED BY FOODS IN HEATED VESSELS

BACKGROUND OF THE INVENTION

The present invention refers to a device to compensate for an external sources' thermic effects on a sensitive element in a system which automatically controls the temperature reached by foods in vessels heated by a gas burner or by an electric heater, of the type comprising means to set the desired temperature for said foods, comprising normally a knob, whose output signal is compared to the output signal of the sensitive element which is pushed in contact with the bottom of the vessel by springs.

Said automatic control system detects behavior which deviates from the optimum as the influence on the sensitive element from thermic sources external to the heating means for the vessel increases. For instance if a gas burner (or an electric heater) is located above a cooking oven for foods, the heat produced by the oven reaches said sensitive element located near the gas burner or the electric heater and affects the output signal from the element.

SUMMARY OF THE INVENTION

It is an object of the present invention to implement a device to compensate for an external sources' thermic effects on a sensitive element in an automatic temperature control system of the above said type, in order to avoid the above said drawback and assure a greater accuracy of the control behavior of the said automatic temperature control system.

According to the present invention, a device is described to compensate for an external sources' thermic effects on a sensitive element in an automatic control system of the temperature reached by foods in heated vessels, comprising means to set the desired temperature for said foods, characterized in that electric means are provided to obtain the said compensation.

BRIEF DESCRIPTION OF THE DRAWINGS

In order to have a better understanding of the present invention a particular embodiment is now described, as a non limiting example only, referring to the attached drawings, where.

DETAILED DESCRIPTION OF THE INVENTION

Figure 1:
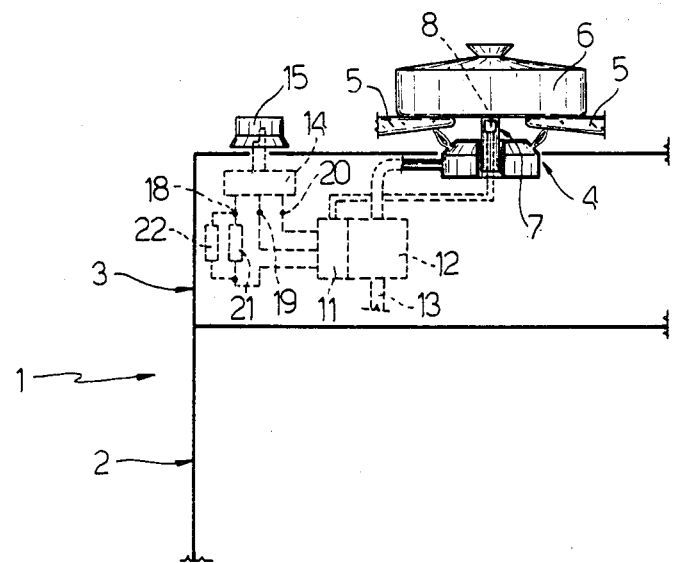
FIG. 1 is a diagrammatic view of an application to a gas burner of the device to compensate for an external sources' thermic effects according to the present invention.

Referring to FIG. 1, the number 1 indicates a food cooking range, comprising, in a known manner, in the lower part a cooking oven 2 and in the upper part a top plate 3 with gas burners 4.

In a known manner on the burner 4 there are located grilles 5 to bear a food cooking pan 6, against whose bottom a temperature sensitive block 7 is pushed, internally holding in a known manner a sensitive element 8 (for instance a thermistor i.e. a negative temperature coefficient resistor) electrically connected to a circuital block 11 which controls in a known manner a control valve 12, inserted in a gas input pipe 13 to the burner 4.

To circuital block 11 is further electrically connected a potentiometer 14, having three output terminals 18, 19 and 20, which is driven by a control knob 15, located above the top plate 3. In series with the end terminal 18 of the potentiometer 14, according to the present invention is connected a negative temperature coefficient thermistor 21 i.e. of the same type of that of the sensitive element 8; thermistor 21 and sensitive element 8 are therefore located in an area substantially equally influenced by external thermic sources, for instance the cooking oven 2. A resistor 22 is connected in parallel with the thermistor 21.

Figure 2:
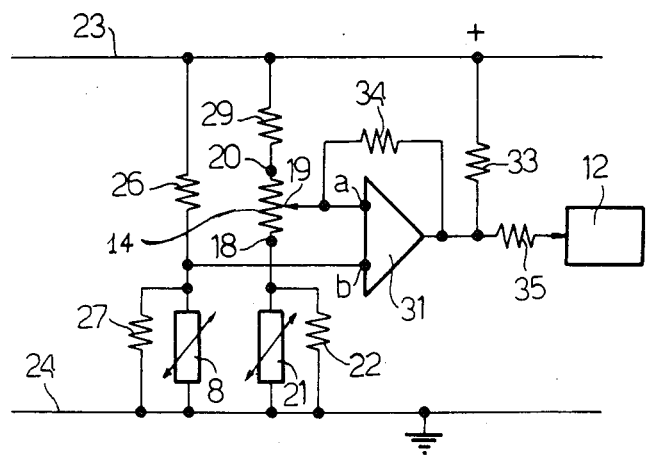
FIG. 2 is an electrical schematic diagram of the compensation device according to the present invention.

In FIG. 2 there is shown with greater detail the electric wiring diagram of the components of the circuital block 11. In particular between a positive voltage supply line 23 and a grounded line 24 there are connected: a resistor 26 in series with the sensitive element 8 which comprises a negative temperature coefficient thermistor having in parallel a resistor 27;

and a resistor 29 connected to the end terminal 20 of potentiometer 14, the terminal 18 on the contrary being connected, as already said, to the line 24 through the group of the thermistor 21 in parallel with the resistor 22. The connecting point of the resistor 26 and the sensitive element 8 is in turn connected to an input terminal b of a differential amplifier 31; the central terminal 19 of potentiometer 14, on the other hand, is connected to an input terminal a of said amplifier 31. The output of amplifier 31 is connected to: a resistor 33 whose other terminal is connected to line 23; to a resistor 34 whose other terminal is connected to an input of amplifier 31, and to a resistor 35 whose other terminal is connected, in a known manner, to the control valve 12.

The operation of the described device is as follows.

Figure 3:
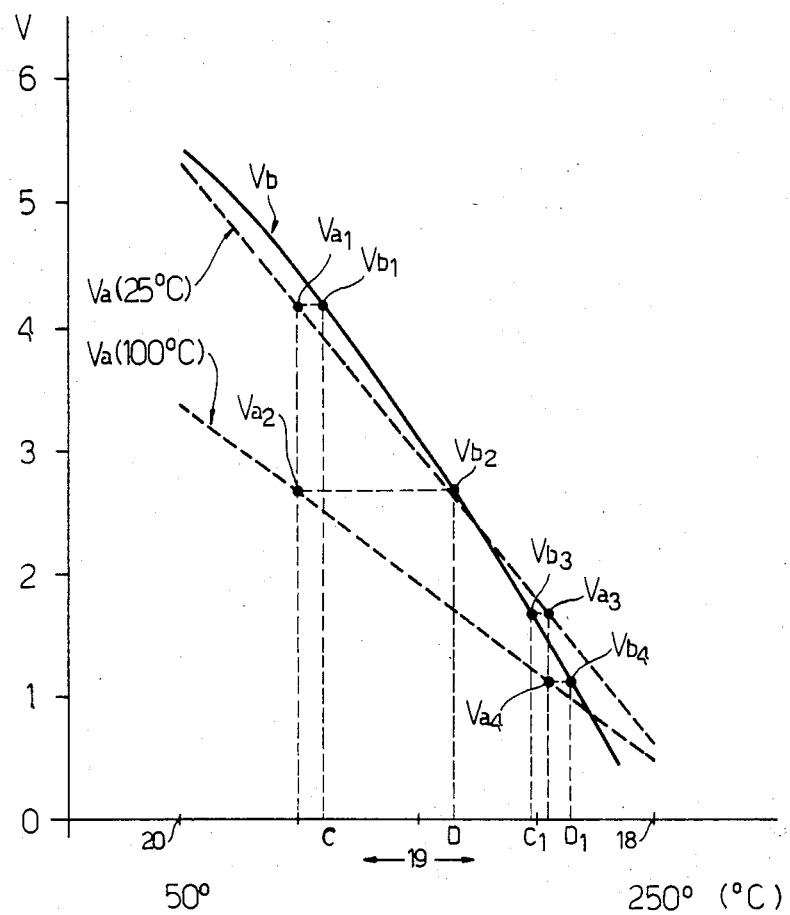
FIG. 3 shows a few characteristic operation curves of the compensation device of FIG. 2.

Referring to FIGS. 1, 2 and 3, setting by means of control knob 15 a desired temperature value for the cooking food in pan 6, a voltage value Va1 at the a input of amplifier 31 is obtained, assuming that ambient temperature in the area underneath top plate 3 where thermistor 21 is located, is about 25° C. (cooking oven 2 off). The upper dotted line of FIG. 3 shows voltage values Va as a function of the position of potentiometer 14 cursor.

In the above said conditions, while the temperature of foods in the pan 6, as perceived by sensitive element 8, is below the C value (FIG. 3), voltage value at b input of amplifier 31, indicated by Vb and represented by a solid line in FIG. 3, while the temperature of foods in pan 6 changes, is always greater than value Va1, so that no signal comes out of amplifier 31. As soon as, due to increasing of the temperature of foods in pan 6, Vb voltage falls to Vb1 value, corresponding to the C value as perceived by sensitive element 8, at the output of amplifier 31 appears the signal that acts on valve 12 so that the gas supply to burner 4 is controlled.

Assuming now that the cooking oven 2 is on, the temperature in the area underneath the top plate 3 is higher, for instance 100° C., so that in FIG. 3, due to thermistor 21, the curve which represents the input voltage to amplifier 31 as a function of the position of control potentiometer 14, is the lower dotted line. Under these conditions, the thermistor 21 will be influenced by the additional heat provided by the oven 2 while the sensing element 8 continues to sense or monitor the temperature of the food in the pan 6. Since both the termistor 21 and the sensor 8 are connected to the circuit 11 which controls the valve 12, the burner 4 or, alternatively, a heating element, will be influenced both by the ambient temperature and the temperature of the pan 6, respectively.

Moreover, because the sensor 8 could be influenced by heat from the heating element 4, the sensor 8 is shielded from the direct heat of the burner 4 by an air-chimney system which is open to the bottom of the temperature sensitive block 7 in order to provide circulation. Thus, air from the lower portion of the burner 4 (particularly air heated by the oven) will influence the sensor 8. For this reason, thermistor 21 is included to compensate for the additional heat of the oven 2.

Assuming that the same position of potentiometer 14 is maintained in order to achieve the same cooking temperature of foods in pan 6, the input voltage of amplifier 31 is now indicated by Va2. Therefore the amplifier 31 gives out the control signal to valve 12 at the Vb2 voltage value, lower than the Vb1 value, and corresponding to a D value of temperature as perceived by sensing element 8, which is higher than the previous value.

In this way compensation for the external influence of heat sources on sensing element 8 is achieved, because the latter acts on valve 12 at a higher temperature value, in order to take account of the amount of heat supplied by the external heat source (cooking oven 2) and so keep the temperature of cooking foods in pan 6 at substantially the same value as before.

It is also to be noticed that the slope of dotted lines which represent the voltages at amplifier 31 input is greater in case of lower surrounding temperature, so as to compensate for the external heat sources' influence, which is related to the desired foods' temperature setting, so that particularly said compensation is lower if the temperature setting by means of knob 15 is higher. Referring to FIG. 3, as regards the previously described case, an increase from C to D of the value at which sensing element 8 operates, combined with a higher value of desired temperature as set by means of knob 15, will result in a lower absolute increase (from C1 to D1) being obtained for the operating temperature value of sensing element 8. As shown in FIG. 3, the pattern of said dotted lines with different slope may be obtained by means of a suitable sizing of the circuit components of FIG. 2.

The advantages obtained by means of the compensation device according to the present invention are therefore clear as described and are obtained by very simple and inexpensive means.

It is clear, moreover, that modifications and variations may be made to the described embodiment of the invention without departing from the scope of it. For instance sensing element 8 and thermistor 21 might be of a different but equivalent type, for instance they may be of positive coefficient type; sensitive block 7 might have a different configuration; or, the invention may be applied to the control of electric heating elements instead of gas burners. Moreover the circuit of FIG. 2 may have a different configuration, still in order to achieve the variable slope of dotted lines in FIG. 3 (straight or curved lines), and the resistor 22 may be substituted with a potentiometer mechanically coupled to potentiometer 14. Such a resistor (or potentiometer) 22 might be connected in series with thermistor 21.

Thermistor 21 might also be located in series with the branch which comprises resistor 26 and sensing element 8.

Eventually the thermistor 21 might comprise a copper coil or a zener diode.

We claim:

1. A device to compensate for the thermal effect of external sources on a temperature sensitive element in a system for automatically controlling the temperature reached by foods in a heated vessel, said device including circuit means to obtain said compensation as a function of the desired foods' temperature setting, said compensation being lower if the value of the set temperature is higher, comprising:
    means to set the desired temperature for said foods;
    means to control the temperature of the heated foods, said means including at least one sensing element for sensing the temperature of the heated foods; and
    electric means for compensating for the thermal effect of external sources on the system.

2. The device according to claim 1, characterized in that said circuit means comprises a potentiometer mechanically coupled to said means to set the desired temperature for said foods.

3. The device according to claim 2 characterized in that said electric means comprises a copper coil.

4. The device according to claim 2 characterized in that said electric means comprises a zener diode.

5. The device according to claim 2 characterized in that said control system automatically controls the temperature reached by foods in vessels heated by a gas burner.

6. The device according to claim 2 characterized in that said control system automatically controls the temperature reached by foods in vessels heated by an electric heating element.

7. Device according to claim 1, characterized in that said desired foods temperature setting means (14,15) and said sensing element (8) are located above a foods cooking oven (2).

8. The device according to claim 1 characterized in that said electric means modifies the output signal of said temperature setting means.

9. The device according to claim 8 characterized in that said electric means modifies the output signal of said sensing element, wherein said sensing element output signal is compared to said output signal of said temperature setting means.

10. The device according to claim 1 characterized in that said electric means comprises a thermistor.

11. A device to compensate for the thermal effect of external sources on a temperature sensitive element in a system for automatically controlling the temperature reached by foods in a heated vessel, said device comprising:
    means to set the desired temperature for said foods including a potentiometer;
    means to control the temperature of heated foods, said means including at least one sensing element for sensing the temperature of the heated foods; and
    electric means including a thermistor connected in series to an end terminal of said potentiometer for compensating for the thermal effect of external sources on the system.

12. The device according to claim 11, characterized in that said thermistor has a temperature coefficient of the same type as the said sensing element.

13. The device according to claim 12, characterized in that said electric means are located substantially in the same area of said sensing element, as regards external heating sources' influence.

14. A device to compensate for the thermal effect of external sources on a temperature sensitive element in a system for automatically controlling the temperature reached by foods in a heated vessel, said device including circuit means to obtain said compensation as a function of the desired foods' temperature setting, said compensation being lower if the value of the set temperature is higher, comprising:
    means including a mechanically coupled potentiometer to set the desired temperature for said foods;
    means to control the temperature of the heated foods, said means including at least one sensing element for sensing the temperature of the heated foods; and
    electric means connected in series with said potentiometer for compensating for the thermal effect of external sources on the system.

15. A device to compensate for the thermal effect of external sources on a temperature sensitive element in a system for automatically controlling the temperature reached by foods in a heated vessel, said device including circuit means to obtain said compensation as a function of the desired foods' temperature setting, said compensation being lower if the value of the set temperature is higher, comprising;
    means including a mechanically coupled potentiometer to set the desired temperature for said foods;
    means to control the temperature of the heated foods, said means including at least one sensing element for sensing the temperature of the heated foods; and
    electric means connected in parallel with said potentiometer for compensating for the thermal effect of external sources on the system.

* * * * *